(12) United States Patent
Tsai et al.

(10) Patent No.: US 7,889,690 B2
(45) Date of Patent: Feb. 15, 2011

(54) METHOD, WIRELESS COMMUNICATION SYSTEM, COMMUNICATION APPARATUS, AND TANGIBLE MACHINE-READABLE MEDIUM FOR ESTABLISHING A ROUTING PATH DURING A NETWORK ENTRY PROCESS OF A SUBSCRIBER STATION BASED ON A MULTI-HOP RELAY STANDARD

(75) Inventors: Yi-Hsueh Tsai, Ban-Chiao (TW); Chih-Chiang Hsieh, Jen-Wu Township, Kaohsiung County (TW); Kan-Chei Loa, Taipei (TW); Yung-Ting Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 166 days.

(21) Appl. No.: 11/954,972

(22) Filed: Dec. 12, 2007

(65) Prior Publication Data

US 2008/0219255 A1 Sep. 11, 2008

Related U.S. Application Data

(60) Provisional application No. 60/893,131, filed on Mar. 6, 2007.

(51) Int. Cl.
*H04B 7/14* (2006.01)

(52) U.S. Cl. ..................... 370/315; 370/352; 455/428

(58) Field of Classification Search ................. 370/315, 370/328, 342, 343, 345, 352, 353, 355, 389, 370/395.3, 395.31; 455/7, 11.1
See application file for complete search history.

(56) References Cited

U.S. PATENT DOCUMENTS

| | | | |
|---|---|---|---|
| 2008/0045139 A1* | 2/2008 | Chen et al. ................ | 455/3.04 |
| 2008/0045141 A1* | 2/2008 | Suga .......................... | 455/7 |
| 2008/0084856 A1* | 4/2008 | Ramachandran ............ | 370/342 |
| 2008/0107076 A1* | 5/2008 | Ramachandran et al. .... | 370/331 |
| 2008/0108303 A1* | 5/2008 | Okuda ........................ | 455/7 |
| 2008/0108304 A1* | 5/2008 | Suga .......................... | 455/7 |
| 2008/0165776 A1* | 7/2008 | Tao et al. .................... | 370/392 |
| 2008/0285500 A1* | 11/2008 | Zhang et al. ................ | 370/315 |
| 2009/0213778 A1* | 8/2009 | Tao et al. .................... | 370/315 |

* cited by examiner

*Primary Examiner*—Donald L Mills
(74) *Attorney, Agent, or Firm*—Patterson Thuente Christensen Pedersen, P.A.

(57) ABSTRACT

A method, a wireless communication system, a communication apparatus, and a tangible machine-readable medium for establishing a routing path during a network entry process of an SS based on a multi-hop relay standard are provided. The wireless communication system comprises a BS, an SS, and an RS. The SS transmits an RNG-REQ of the SS by a ranging CID to the BS through the RS. The BS allocates an SS CID and a routing path for the SS, and transmits an RNG-RSP having the SS CID and the routing path by a path CID to the RS. The RS updates the SS CID and the routing path into a routing table of the RS after receiving the RNG-RSP, and transmits the RNG-RSP having the SS CID by the ranging CID to the SS.

24 Claims, 5 Drawing Sheets

METHOD, WIRELESS COMMUNICATION SYSTEM, COMMUNICATION APPARATUS, AND TANGIBLE MACHINE-READABLE MEDIUM FOR ESTABLISHING A ROUTING PATH DURING A NETWORK ENTRY PROCESS OF A SUBSCRIBER STATION BASED ON A MULTI-HOP RELAY STANDARD

CROSS-REFERENCES TO RELATED APPLICATIONS

This application claims the benefit of Provisional Application Ser. No. 60/893,131 filed on Mar. 6, 2007.

BACKGROUND OF THE INVENTION

1. Field of the Invention

The present invention relates to a method, a wireless communication system, a communication apparatus, and a tangible machine-readable medium for establishing a routing path. More specifically, the present invention relates to a method, a wireless communication system, a communication apparatus, and a tangible machine-readable medium for establishing a routing path during a network entry process of a subscriber station (SS) based on a multi-hop relay standard.

2. Descriptions of the Related Art

Although the IEEE 802.16 standard already provides greater bandwidths, lower building cost, better service quality and expansibility, there still exist some defects of coverage and signal quality of the IEEE 802.16 standard. Therefore, the IEEE 802.16j standard working group established a multi-hop relay study group in July, 2005 for building a multi-hop relay standard.

In conventional IEEE 802.16 standard, network entry process is easily to execute because a base station (BS) and a plurality of subscriber stations (SSs) transmit data to each other directly. But in the multi-hop relay standard, such as the IEEE 802.16j standard, there are relay stations (RSs) to relay data between the BS and the SSs. Accordingly, the routing paths between the BS and the SSs are more complicated because of data's relay, so that the network entry process will be more difficult between the BS and the SSs.

When an SS, such as a mobile station (MS), enters into a multi-hop relay stations (MR-RSs) network under the IEEE 802.16j during a network entry process, a solution to choosing and/or managing relay paths of the MR-RSs network under the IEEE 802.16j standard which transmit data from a BS to the SS is desired.

SUMMARY OF THE INVENTION

One objective of this invention is to provide a method for establishing a routing path during a network entry process of an SS based on a multi-hop relay standard. The method comprises the following steps: transmitting a ranging request (RNG-REQ) of the SS by a ranging connection identification (CID) from the SS to a BS through an RS; allocating SS CIDs and a routing path for the SS; transmitting a ranging response (RNG-RSP) having the SS CIDs and the routing path by a path CID (such as a tunnel management CID or an RS basic CID) from the BS to the RS; updating the SS CIDs and the routing path into a routing table of the RS after receiving the RNG-RSP; and transmitting the RNG-RSP having the SS CIDs by the ranging CID from the RS to the SS.

Another objective of this invention is to provide a method for an RS having an RS CID to establish a routing path during a network entry process of an SS based on a multi-hop relay standard. The method comprises the following steps receiving an RNG-RSP having SS CIDs and a routing path for the SS by a path CID (such as a tunnel management CID or an RS basic CID); updating the SS CIDs and the routing path into a routing table of the RS after receiving the RNG-RSP; and transmitting the RNG-RSP having the SS CIDs by a ranging CID to the SS.

Another objective of this invention is to provide a wireless communication system for establishing a routing path during a network entry process of an SS based on a multi-hop relay standard. The wireless communication system comprises a BS, an SS, and an RS. The SS transmits an RNG-REQ of the SS by a ranging CID to the BS through the RS. The BS allocates an SS CIDs and a routing path for the SS, and transmits an RNG-RSP having the SS CIDs and the routing path by a path CID (such as a tunnel management CID or an RS basic CID) to the RS. The RS updates the SS CIDs and the routing path into a routing table of the RS after receiving the RNG-RSP, and transmits the RNG-RSP having the SS CIDs by the ranging CID to the SS.

Another objective of this invention is to provide a communication apparatus for establishing a routing path during a network entry process of an SS based on a multi-hop relay standard. The communication apparatus comprises a receiving module, a memory, a processor, and a transmitting module. The receiving module receives an RNG-RSP having SS CIDs and a routing path for the SS by a path CID (such as RS basic CID or tunnel management CID). The memory stores a routing table. The processor updates the SS CIDs and the routing path into the routing table after receiving the RNG-RSP. The transmitting module transmits the RNG-RSP having the SS CIDs by a ranging CID to the SS.

Another objective of this invention is to provide a tangible machine-readable medium having executable code to cause a machine to perform a method for establishing a routing path during a network entry process of an SS based on a multi-hop relay standard. The method comprises the following steps: transmitting an RNG-REQ of the SS by a ranging CID from the SS to a BS through an RS; allocating an SS CIDs and a routing path for the SS; transmitting an RNG-RSP having the SS CIDs and the routing path by a path CID (such as a tunnel management CID or an RS basic CID) from the BS to the RS; updating the SS CIDs and the routing path into a routing table of the RS after receiving the RNG-RSP; and transmitting the RNG-RSP having the SS CIDs by the ranging CID from the RS to the SS.

Yet a further objective of this invention is to provide a tangible machine-readable medium having executable code to cause a machine to perform a method for an RS having an RS CID to establish a routing path during a network entry process of an SS based on a multi-hop relay standard. The method comprises the following steps: receiving an RNG-RSP having SS CIDs and a routing path for the SS by a path CID (such as a tunnel management CID or an RS basic CID); updating the SS CIDs and the routing path into a routing table of the RS after receiving the RNG-RSP; and transmitting the RNG-RSP having the SS CIDs by a ranging CID to the SS.

The aforesaid method can be executed by wireless communication apparatus, such as a BS or an RS in the wireless communication system. By receiving an RNG-RSP which has an SS CIDs and a routing path for an SS form the BS, and updating the SS CIDs and the routing path into a routing table which is stored in the RS, this invention can choose and/or manage relay paths of the RS of the wireless communication system. Thus, data of the wireless communication system based on a multi-hop relay standard can be transmitted successfully among the BS, RSs, and SSs.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
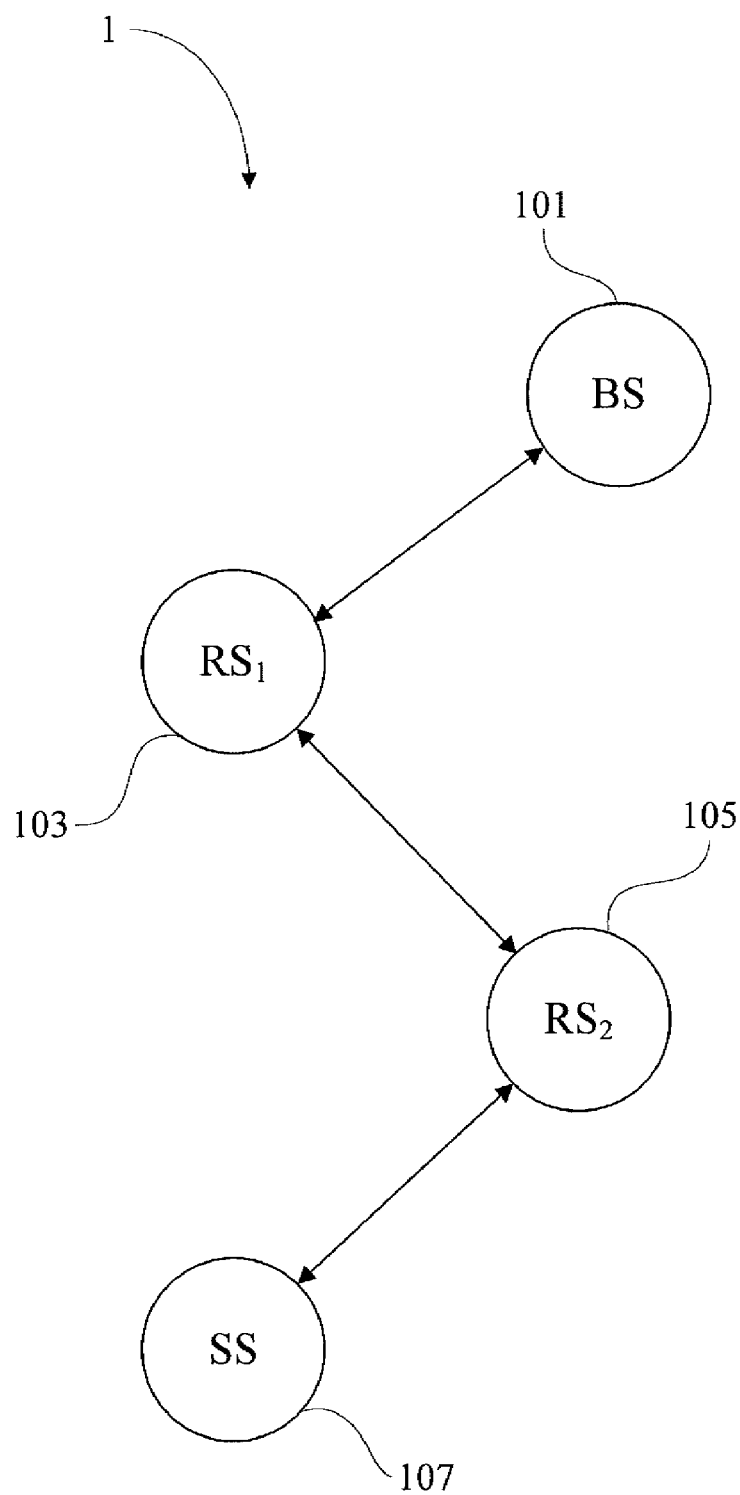
FIG. 1 illustrates a multi-hop relay wireless communication system of a first embodiment of the present invention.
Figure 2:
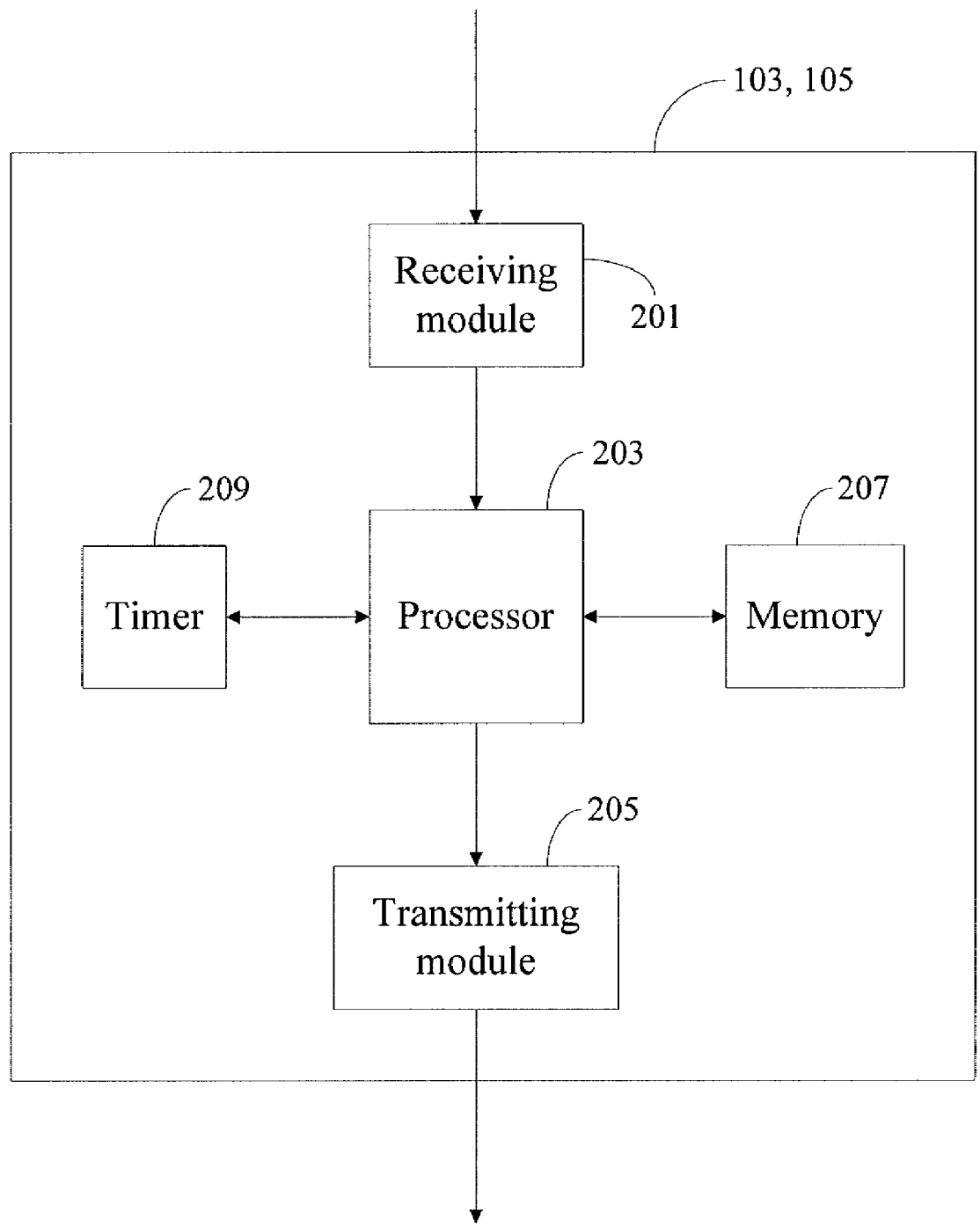
FIG. 2 illustrates a block diagram of an RS of the first embodiment.

As illustrated in FIG. 1, a first embodiment of the present invention is a multi-hop relay wireless communication system 1 based on a multi-hop relay standard, such as IEEE 802.16j standard. The multi-hop relay wireless communication system 1 comprises an BS 101, a plurality of RSs 103, 105, and an SS 107. For the sake of simplification, two RSs ($RS_1$ 103, and $RS_2$ 105) are illustrated. The SS 107 can be an MS or another RS which can provide functions based on the multi-hop relay standard. The RSs 103, 105 of the multi-hop relay wireless communication system 1 is illustrated in FIG. 2, which comprises a receiving module 201, a processor 203, a transmitting module 205, a memory 207, and a timer 209. Data transmission of network entry process of the SS 107 based on the multi-hop relay wireless communication system 1 is illustrated in FIG. 3.

Figure 3:
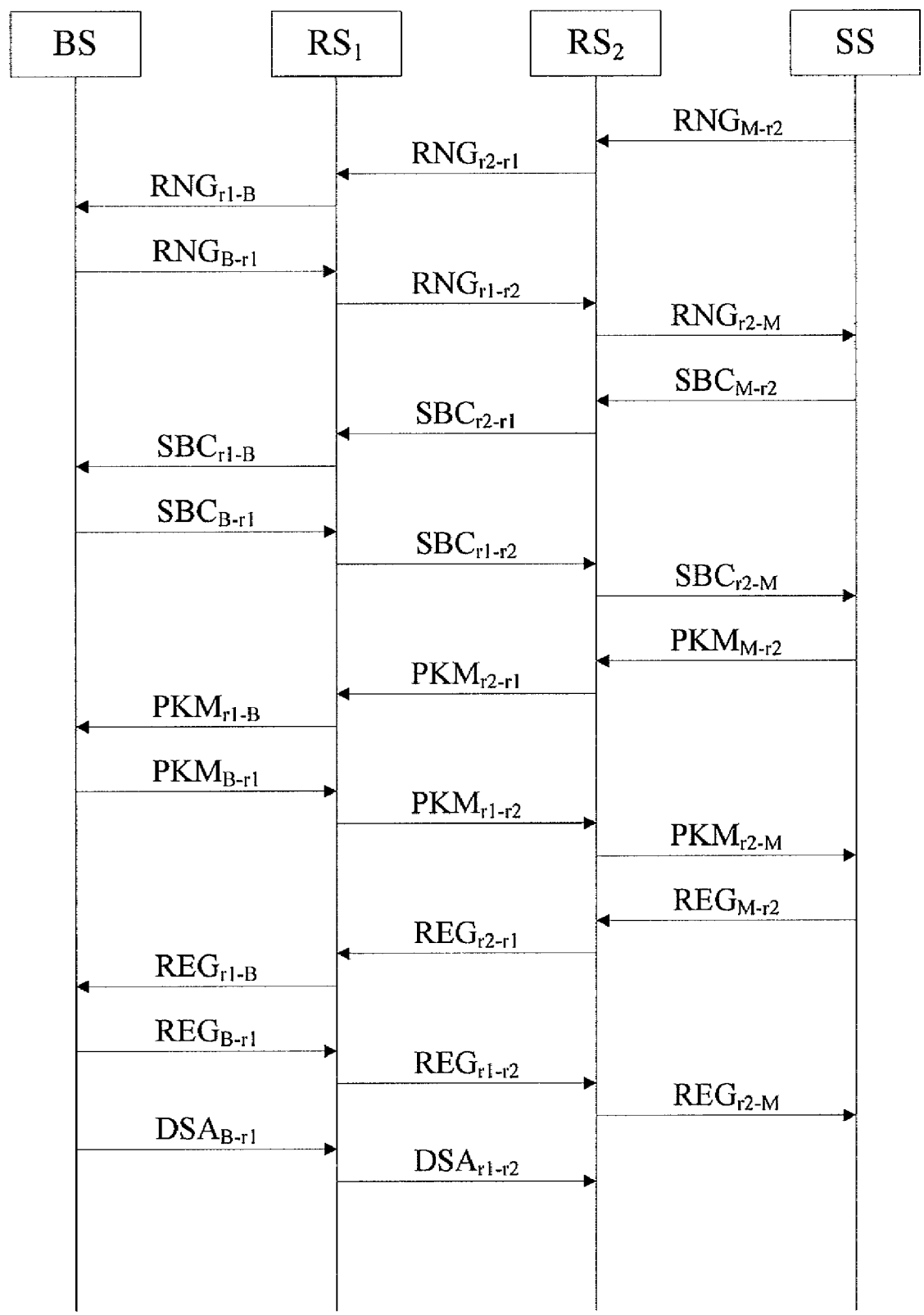
FIG. 3 illustrates diagrams of data transmission of network entry process of an SS of the first embodiment.

In FIG. 3, because the $RS_1$ 103 and the $RS_2$ 105 have entered into the multi-hop relay stations system 1, the SS 107 can execute the network entry process to enter into the multi-hop relay stations system 1 via the $RS_1$ 103 and the $RS_2$ 105. When starting the network entry process, the SS 107 transmits an RNG-REQ $RNG_{M-r2}$ which comprises an SS MAC address of the SS 107 by a ranging CID to the $RS_2$. The ranging CID is used in the network entry process. After the receiving module 201 of the $RS_2$ 105 receives the RNG-REQ $RNG_{M-r2}$ and the processor 203 of the $RS_2$ 105 processes the RNG-REQ $RNG_{M-r2}$, the transmitting module 205 of the $RS_2$ 105 transmits an RNG-REQ $RNG_{r2-r1}$ which comprises the SS MAC address with hashed message authentication code and/or cipher-based message authentication code (HMAC/CMAC) by the $RS_2$ basic CID/tunnel management CID to the $RS_1$ 103. And after receiving the RNG-REQ $RNG_{r2-r1}$, the $RS_1$ 103 transmits an RNG-REQ $RNG_{r1-B}$ which comprises the SS MAC address with HMAC/CMAC by the $RS_2$ basic CID to the BS 101.

After the BS 101 receives the RNG-REQ $RNG_{r1-B}$, the BS 101 will allocate an SS basic CID, an SS primary CID, and a routing path for the SS 107. Then the BS 101 transmits an RNG-RSP $RNG_{B-r1}$ which comprises the SS basic CID, the SS primary CID, and the routing path of the SS 107 with HMAC/CMAC by a path CID to the RS, 103. The $RS_1$ 103 updates the SS basic CID, the SS primary CID, the $RS_2$ basic CID/tunnel management CID, and the routing path of the SS 107 into a routing table which is stored in the memory 207 of the $RS_1$ 103. After that, the $RS_1$ 103 transmits an RNG-RSP $RNG_{r1-r2}$ which comprises the SS basic CID and the SS primary CID with HMAC/CMAC by the path CID to the $RS_2$ 105. Then, the $RS_2$ 105 will update the SS basic CID, the SS primary CID, and the routing path of the SS 107 into a routing table which is stored in the memory 207 of the $RS_2$ 105. Finally, the $RS_2$ 105 transmits an RNG-RSP $RNG_{r2-M}$ which comprises the SS basic CID and the SS primary CID by the ranging CID to the SS 107 so that the SS 107 will be assigned the SS basic CID and the SS primary CID.

After the routing table of the $RS_1$ 103 is updated, a timer 209 of the RS 1103 starts a timeout period to wait the BS 101 to transmit a dynamic service addition request (DSA-REQ). Similarly, a timer 209 of the $RS_2$ 105 starts another timeout period to wait the BS 101 to transmit a DSA-REQ.

Second, the SS 107 transmits an SBC-REQ $SBC_{M-r2}$ by the SS basic CID to the $RS_2$ 105, the $RS_2$ 105 transmits an SBC-REQ $SBC_{r2-r1}$ by the SS basic CID to the $RS_1$ 103, and the $RS_1$ 103 transmits an SBC-REQ $SBC_{r1-B}$ by the SS basic CID to the BS 101. After processing the SBC-REQ $SBC_{r1-B}$, the BS 101 transmits an SBC-RSP $SBC_{B-r1}$ by the SS basic CID to the $RS_1$ 103, the $RS_1$ 103 transmits an SBC-RSP $SBC_{r1-r2}$ by the SS basic CID to the $RS_2$ 105, and the $RS_2$ 105 transmits an SBC-RSP $SBC_{r2-M}$ by the SS basic CID to the SS 107.

Third, the SS 107 transmits a PKM-REQ $PKM_{M-r2}$ by the SS primary CID to the $RS_2$ 105, the $RS_2$ 105 transmits a PKM-REQ $PKM_{r2-r1}$ by the SS primary CID to the $RS_1$ 103, and the $RS_1$ 103 transmits a PKM-REQ $PKM_{r1-B}$ by the SS primary CID to the BS 101. After processing the PKM-REQ $PKM_{r1-B}$, the BS 101 transmits a PKM-RSP $PKM_{B-r1}$ by the SS primary CID to the $RS_1$ 103, the $RS_1$ 103 transmits a PKM-RSP $PKM_{r1-r2}$ by the SS primary CID to the $RS_2$ 105, and the $RS_2$ 105 transmits a PKM-RSP $PKM_{r2-M}$ by the SS primary CID to the SS 107.

Fourth, the SS 107 transmits an REG-REQ $REG_{M-r2}$ with HMAC/CMAC by the SS primary CID to the $RS_2$ 105, the $RS_2$ 105 transmits an REG-REQ $REG_{r2-r1}$ with HMAC/CMAC by the SS primary CID to the $RS_1$ 103, and the $RS_1$ 103 transmits an REG-REQ $REG_{r1-B}$ with HMAC/CMAC by the SS primary CID to the BS 101. After processing the REG-REQ $REG_{r1-B}$, the BS 101 transmits an REG-RSP $REG_{B-r1}$ with HMAC/CMAC by the SS primary CID to the $RS_1$ 103, the $RS_1$ 103 transmits an REG-RSP $REG_{r1-r2}$ with HMAC/CMAC by the SS primary CID to the $RS_2$ 105, and the $RS_2$ 105 transmits an REG-RSP $REG_{r2-M}$ with HMAC/CMAC by the SS primary CID to the SS 107.

Finally, the BS 101 transmits a DSA-REQ $DSA_{B-r1}$ which comprises the SS basic CID with HMAC/CMAC by the $RS_2$ primary CID to the $RS_1$ 103 and the $RS_1$ 103 transmits a DSA-REQ $DSA_{r1-r2}$ which comprises the SS basic CID with HMAC/CMAC by the $RS_2$ primary CID to the $RS_2$ 105. If the $RS_1$ 103 receives the DSA-REQ $DSA_{B-r1}$ in the timeout period which is started by the timer 209 of the $RS_1$ 103, the SS basic CID, the SS primary CID, the $RS_2$ basic CID/tunnel management CID, and the routing path of the SS 107 stored in the routing table of the $RS_1$ 103 will be kept. Otherwise, if the $RS_1$ 103 receives the DSA-REQ $DSA_{B-r1}$ out of the timeout period which is started by the timer 209 of the $RS_1$ 103, the SS basic CID, the SS primary CID, the $RS_2$ basic CID/tunnel management CID, and the routing path of the SS 107 stored in the routing table of the $RS_1$ 103 will be removed. Similarly, if the $RS_2$ 105 receives the DSA-REQ $DSA_{r1-r2}$ in the timeout period which is started by the timer 209 of the $RS_2$ 105, the SS basic CID, the SS primary CID, and the routing path of the SS 107 stored in the routing table of the $RS_2$ 105 will be kept. Otherwise, if the $RS_2$ 105 receives the DSA-REQ $DSA_{r1-r2}$ out of the timeout period which is started by the timer 209 of the RS₂ 105, the SS basic CID, the SS primary CID, and the routing path of the SS 107 stored in the routing table of the RS₂ 105 will be removed.

Figure 4:
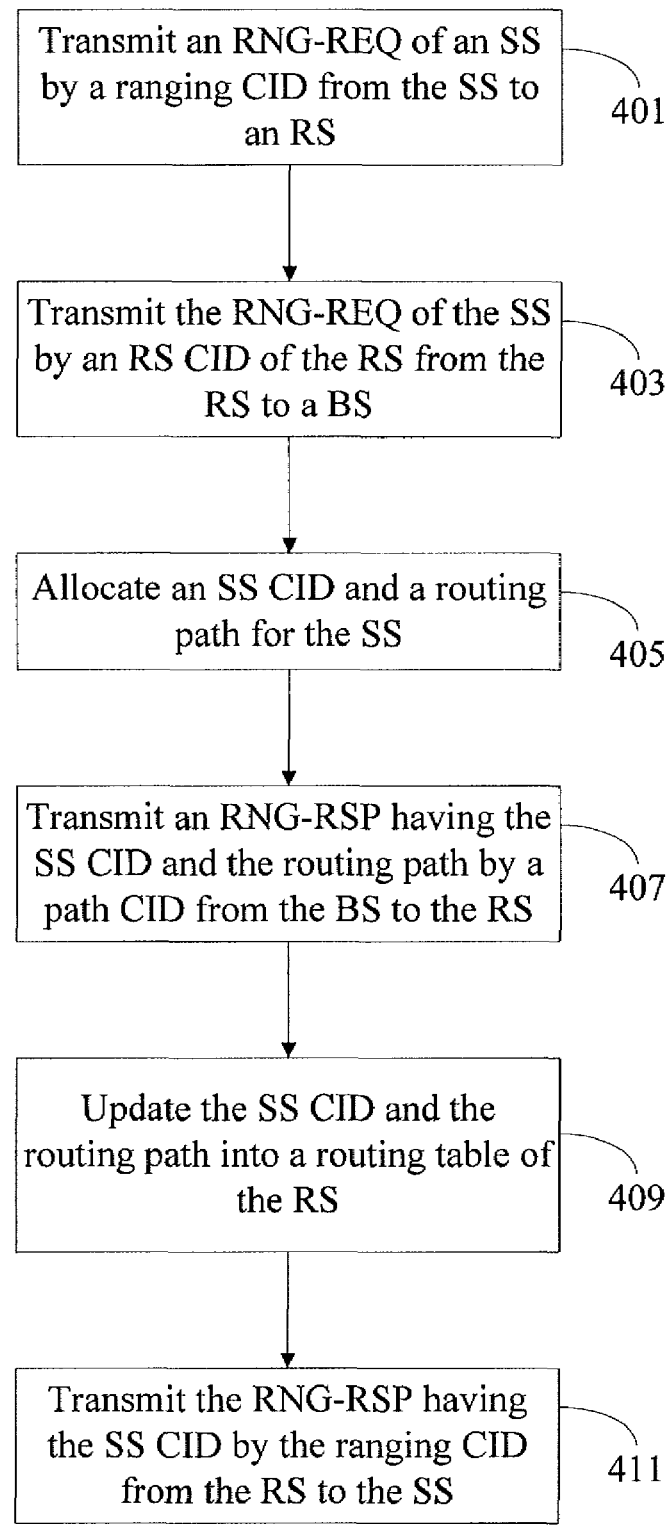
FIG. 4 is a flow chart illustrating a second embodiment of the present invention.

A second embodiment of this invention is a method for establishing a routing path during a network entry process of an SS based on a multi-hop relay standard, which is a method applied to the multi-hop relay wireless communication system 1 described in the first embodiment. More specifically, the method of the second embodiment which is illustrated in FIG. 4 can be implemented by an application program controlling various modules of a wireless communication apparatus in the multi-hop relay wireless communication system 1. This application program may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In step 401, an RNG-REQ of an SS, such as the SS 107, is transmitted by a ranging CID from the SS to an RS. Next in step 403, the RNG-REQ of the SS is transmitted by an RS basic CID/tunnel management CID of the RS from the RS to a BS, such as the BS 101. In step 405, an SS CIDs and a routing path for the SS are allocated by the BS. In step 407, an RNG-RSP having the SS CIDs and the routing path is transmitted by a path CID (such as an RS basic CID or a tunnel management CID) from the BS to the RS. In step 409, the SS CIDs and the routing path are updated into a routing table of the RS after the RS receives the RNG-RSP. Finally, in step 411, the RNG-RSP having the SS CIDs is transmitted by the ranging CID from the RS to the SS.

In addition to the steps revealed in FIG. 4, the second embodiment can also execute all the operations of the first embodiment, in which those skilled in the art can understand the corresponding steps and operations of the second embodiment by the explanation of the first embodiment, and thus no necessary detail is given.

Figure 5:
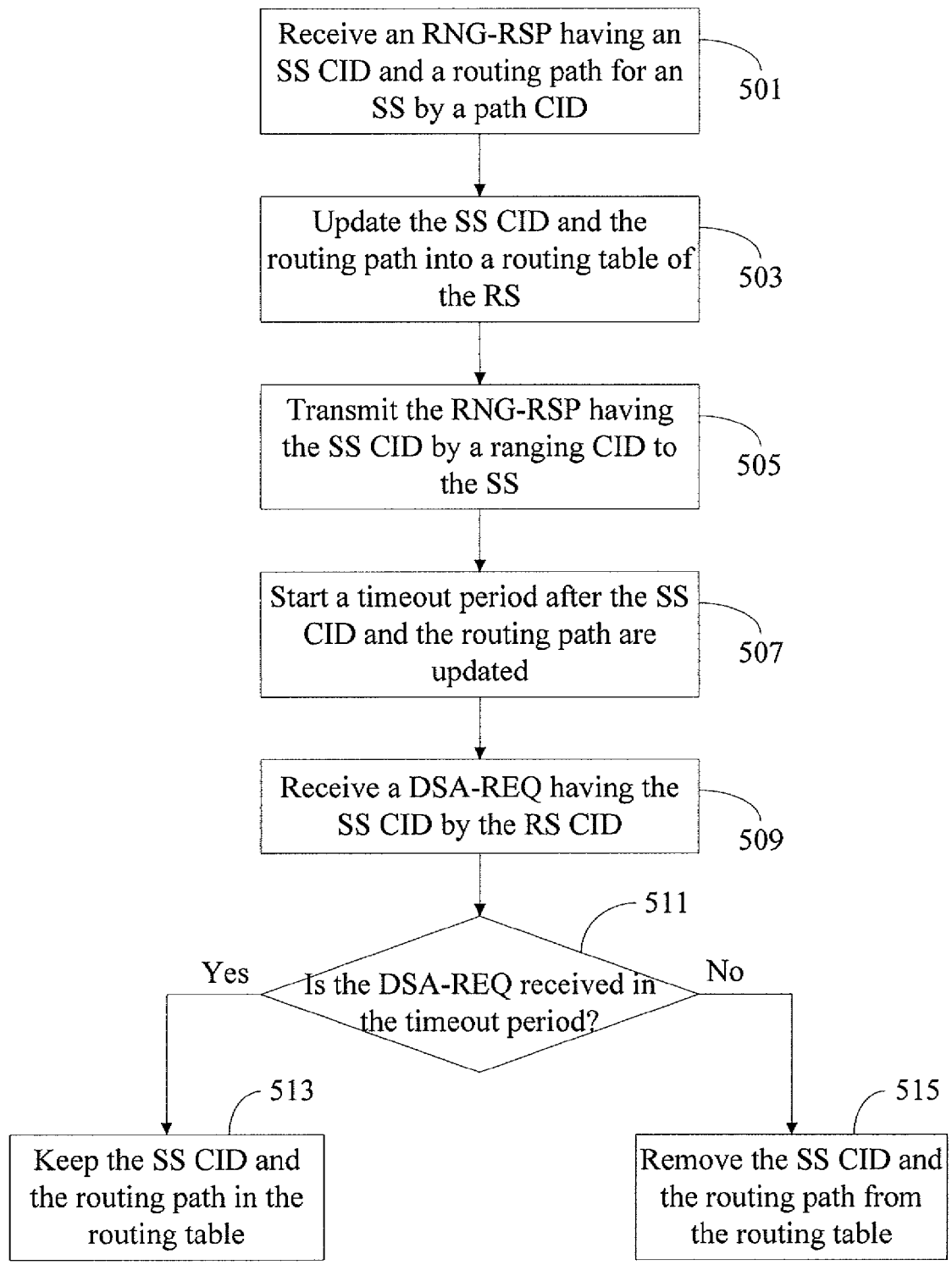
FIG. 5 is a flow chart illustrating a third embodiment of the present invention.

A third embodiment of this invention is a method for an RS having an RS basic CID/tunnel management CID to establish a routing path during a network entry process of an SS based on a multi-hop relay standard, which is a method applied to the RS₁ 103 or RS₂ 105 of the multi-hop relay wireless communication system 1 described in the first embodiment. More specifically, the method of the third embodiment which is illustrated in FIG. 5 can be implemented by an application program controlling various modules of an RS in the multi-hop relay wireless communication system 1. This application program may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In step 501, an RNG-RSP having SS CIDs and a routing path for an SS, such as the SS 107 is received by a path CID (such as an RS basic CID or a tunnel management CID). Next in step 503, the SS CIDs and the routing path are updated into a routing table of the RS after the RS receives the RNG-RSP. In step 505, the RNG-RSP having the SS CIDs is transmitted by a ranging CID to the SS. In step 507, a timeout period is started after the SS CIDs and the routing path are updated. In step 509, a DSA-REQ having the SS CID is received by the RS CIDs. In step 511, the RS determines whether the DSA-REQ is received in the timeout period. If yes, step 513 is executed for keeping the SS CIDs and the routing path in the routing table. If no, step 515 is executed for removing the SS CIDs and the routing path from the routing table.

In addition to the steps revealed in FIG. 5, the third embodiment can also execute all the operations of the first embodiment, in which those skilled in the art can understand the corresponding steps and operations of the third embodiment by the explanation of the first embodiment, and thus no necessary detail is given.

Accordingly, by receiving an RNG-RSP which has SS CIDs and a routing path for an SS form the BS, and updating the SS CIDs and the routing path into a routing table which is stored in the RS, this invention can choose and/or manage relay paths of the RS of the wireless communication system. Thus, data of the wireless communication system based on a multi-hop relay standard can be transmitted successfully among the BS, RSs, and SSs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for establishing a routing path during a network entry process of a subscriber station (SS) based on a multi-hop relay standard, comprising the steps of:
   transmitting a ranging request (RNG-REQ) of the SS by a ranging connection identification (CID) from the SS to a base station (BS) through a first relay station (RS);
   allocating an SS CID and a routing path for the SS;
   transmitting a ranging response (RNG-RSP) having the SS CID and the routing path by a path CID from the BS to the first RS;
   updating the SS CID and the routing path into a routing table of the first RS after receiving the RNG-RSP;
   transmitting the RNG-RSP having the SS CID by the ranging CID from the first RS to the SS;
   starting a timeout period after the SS CID and the routing path are updated; and
   receiving a dynamic service addition request (DSA-REQ) having the SS CID;
   wherein when the DSA-REQ is received in the timeout period, the SS CID and the routing path are still kept in the routing table.

2. The method as claimed in claim 1, wherein the step of transmitting the RNG-REQ further comprises the step of transmitting the RNG-REQ by a first RS CID from the first RS to the BS.

3. The method as claimed in claim 1, wherein the SS CID is one of an SS basic CID and an SS primary CID.

4. The method as claimed in claim 1, wherein the SS is one of a second RS and a mobile station (MS).

5. A method for applied to an RS having an RS CID to establish a routing path during a network entry process of an SS based on a multi-hop relay standard, the RS comprising a receiving module, a processor, a transmitting module, a memory, and a timer, the method comprising the steps of:
   receiving an RNG-RSP having an SS CID and a routing path for the SS by a path CID via the receiving module;
   updating the SS CID and the routing path into a routing table stored in the memory of the RS via the processor after receiving the RNG-RSP;

transmitting the RNG-RSP having the SS CID by a ranging CID to the SS via the transmitting module;
starting a timeout period via the timer after the SS CID and the routing path are updated; and
receiving a dynamic service addition request (DSA-REQ) having the SS CID by the RS CID via the receiving module;
wherein when the DSA-REQ is received in the timeout period, the SS CID and the routing path are still kept in the routing table.

6. The method as claimed in claim 5, further comprising the steps of:
starting a timeout period via the timer after the SS CID and the routing path are updated; and
receiving a dynamic service addition request (DSA-REQ) having the SS CID by the RS CID via the receiving module;
wherein when the DSA-REQ is received out of the timeout period, the SS CID and the routing path are removed from the routing table.

7. The method as claimed in claim 5, wherein the SS CID is one of an SS basic CID and an SS primary CID.

8. The method as claimed in claim 5, wherein the SS is one of another RS and an MS.

9. A wireless communication system for establishing a routing path during a network entry process of an SS based on a multi-hop relay standard, comprising:
a first RS having a routing table;
a BS; and
an SS for transmitting an RNG-REQ of the SS by a ranging CID to the BS through the first RS;
wherein the BS allocates an SS CID and a routing path for the SS, and transmits an RNG-RSP having the SS CID and the routing path by a path CID to the first RS, the first RS updates the SS CID and the routing path into the a routing table of the first RS after receiving the RNG-RSP, and transmits the RNG-RSP having the SS CID by the ranging CID to the SS, the first RS further starts a timeout period after the SS CID and the routing path are updated, the SS CID and the routing path are still kept in the routing table if the first RS receives a DSA-REQ having the SS CID in the timeout period.

10. The wireless communication system as claimed in claim 9, wherein the first RS transmits the RNG-REQ by a first RS CID to the BS.

11. The wireless communication system as claimed in claim 9, wherein the SS CID is one of an SS basic CID and an SS primary CID.

12. The wireless communication system as claimed in claim 9, wherein the SS is one of a second RS and an MS.

13. A communication apparatus for establishing a routing path during a network entry process of an SS based on a multi-hop relay standard, comprising:
a receiving module for receiving an RNG-RSP having an SS CID and a routing path for the SS by a path CID;
a memory for storing a routing table;
a processor for updating the SS CID and the routing path into the routing table of the RS after receiving the RNG-RSP;
a transmitting module for transmitting the RNG-RSP having the SS CID by a ranging CID to the SS;
a timer for starting a timeout period after the SS CID and the routing path are updated;
wherein when the receiving module receives a DSA-REQ having the SS CID by the RS CID in the timeout period, the SS CID and the routing path are still kept in the routing table.

14. The communication apparatus as claimed in claim 13, further comprising:
a timer for starting a timeout period after the SS CID and the routing path are updated;
wherein when the receiving module receives a DSA-REQ having the SS CID by the RS CID out of the timeout period, the SS CID and the routing path are removed from the routing table.

15. The communication apparatus as claimed in claim 13, wherein the SS CID is one of an SS basic CID and an SS primary CID.

16. The communication apparatus as claimed in claim 13, wherein the SS is one of another RS and an MS.

17. A computer program storage product, comprising a tangible machine-readable medium having executable code to cause a machine to perform a method for establishing a routing path during a network entry process of an SS based on a multi-hop relay standard, the method comprising steps of:
transmitting an RNG-REQ of the SS by a ranging CID from the SS to a BS through a first RS;
allocating an SS CID and a routing path for the SS;
transmitting an RNG-RSP having the SS CID and the routing path by a path CID from the BS to the first RS;
updating the SS CID and the routing path into a routing table of the first RS after receiving the RNG-RSP;
transmitting the RNG-RSP having the SS CID by the ranging CID from the first RS to the SS;
starting a timeout period after the SS CID and the routing path are updated; and
receiving a dynamic service addition request (DSA-REQ) having the SS CID;
wherein when the DSA-REQ is received in the timeout period, the SS CID and the routing path are still kept in the routing table.

18. The tangible machine-readable medium computer program storage product as claimed in claim 17, wherein the step of transmitting the RNG-REQ further comprises the step of transmitting the RNG-REQ by a first RS CID from the first RS to the BS.

19. The tangible machine-readable medium computer program storage product as claimed in claim 17, wherein the SS CID is one of an SS basic CID and an SS primary CID.

20. The tangible machine-readable medium computer program storage product as claimed in claim 17, wherein the SS is one of a second RS and an MS.

21. A computer program storage product, comprising a tangible machine-readable medium having executable code to cause a machine to perform a method for an RS having an RS CID to establish a routing path during a network entry process of an SS based on a multi-hop relay standard, the method comprising steps of:
receiving an RNG-RSP having an SS CID and a routing path for the SS by a path CID;
updating the SS CID and the routing path into a routing table of the RS after receiving the RNG-RSP;
transmitting the RNG-RSP having the SS CID by a ranging CID to the SS;
starting a timeout period after the SS CID and the routing path are updated; and
receiving a DSA-REQ having the SS CID by the RS CID;
wherein when the DSA-REQ is received in the timeout period, the SS CID and the routing path are still kept in the routing table.

22. The tangible machine-readable medium computer program storage product as claimed in claim 21, wherein the method further comprises the steps of:

starting a timeout period after the SS CID and the routing path are updated; and receiving a dynamic service addition request (DSA-REQ) having the SS CID by the RS CID;

wherein when the DSA-REQ is received out of the timeout period, the SS CID and the routing path are removed from the routing table.

23. The tangible machine-readable medium computer program storage product as claimed in claim 21, wherein the SS CID is one of an SS basic CID and an SS primary CID.

24. The tangible machine-readable medium computer program storage product as claimed in claim 21, wherein the SS is one of another RS and an MS.

* * * * *